May 14, 1968 A. GARABEDIAN 3,383,265
METHOD AND APPARATUS FOR WELDING PLASTICS
Filed July 20, 1965 2 Sheets-Sheet 1
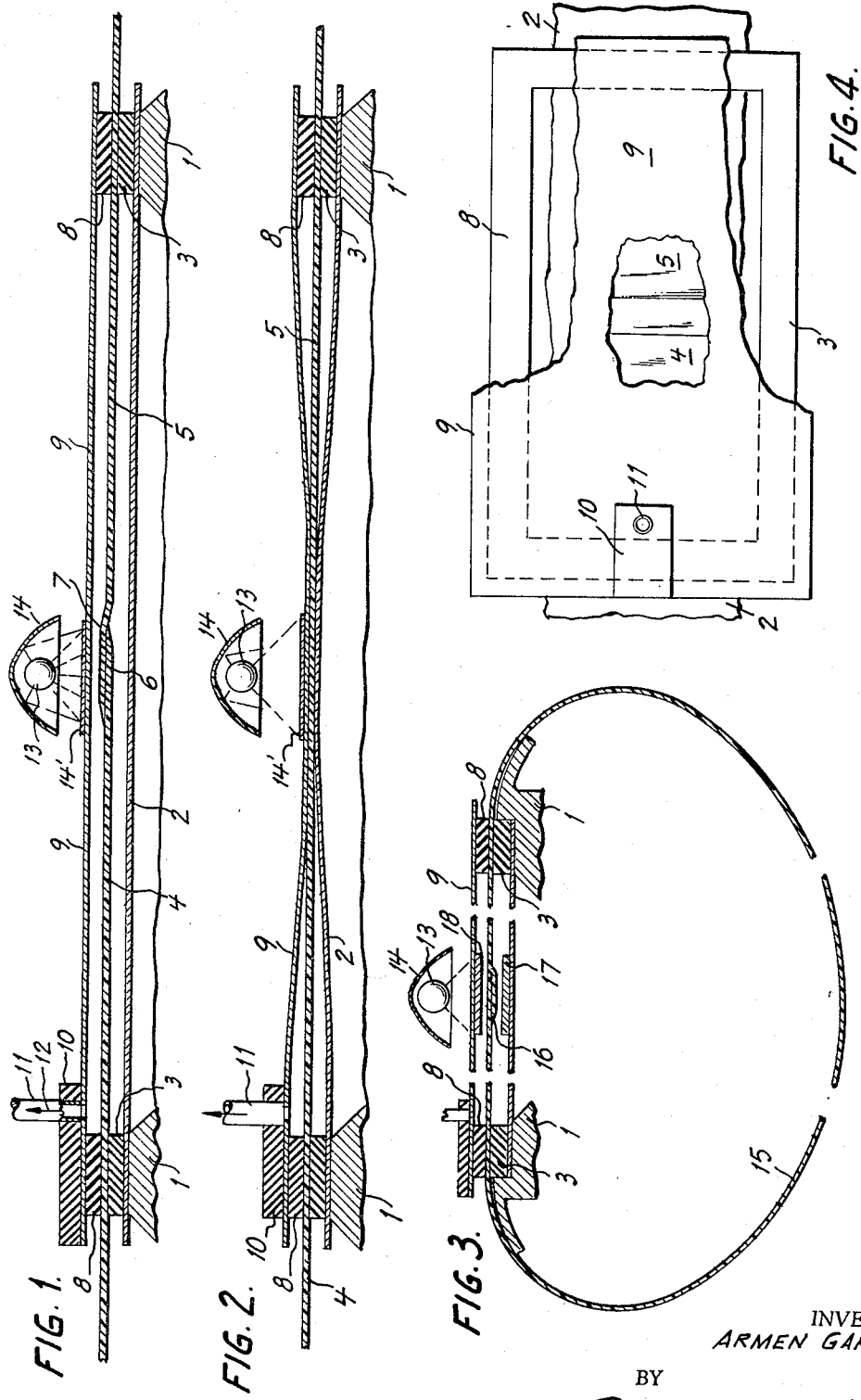
INVENTOR.
ARMEN GARABEDIAN
BY
Bierman + Bierman
ATTORNEYS

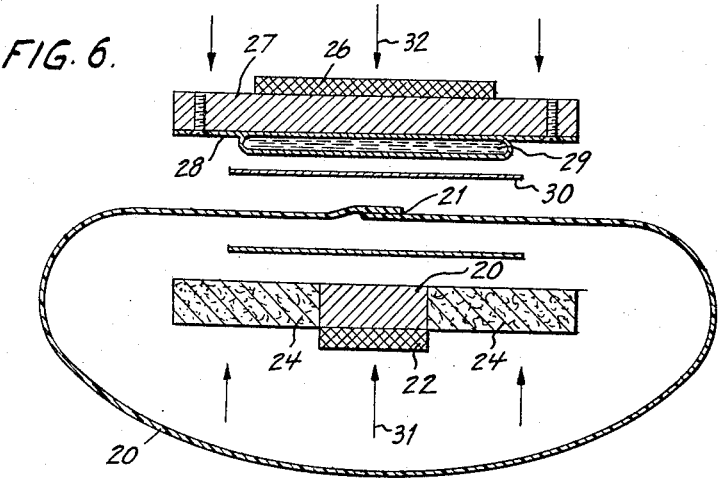
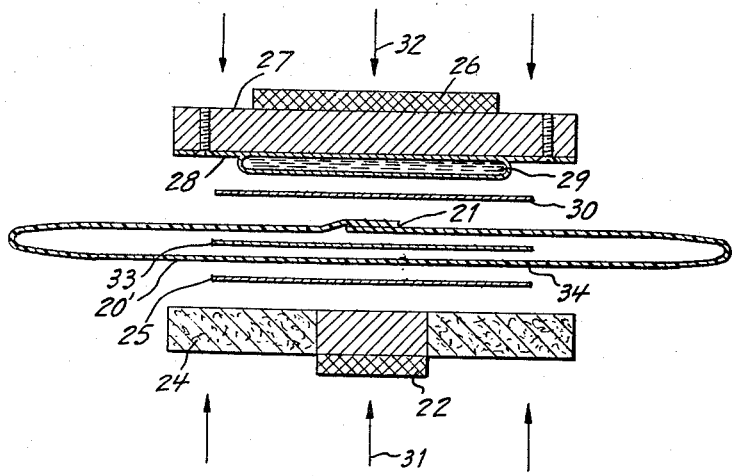
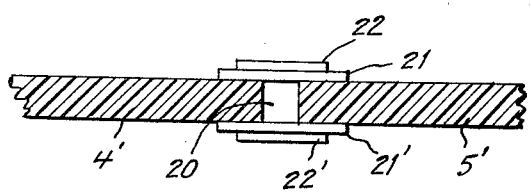
INVENTOR.
ARMEN GARABEDIAN

3,383,265
METHOD AND APPARATUS FOR WELDING PLASTICS
Armen Garabedian, 8—22 Astoria Blvd.,
Long Island City, N.Y. 11102
Filed July 20, 1965, Ser. No. 473,342
15 Claims. (Cl. 156—272)

The present invention is directed to welding both plastic and metal types of materials. Plastic film or sheet may be supported or non-supported versions, thermosealable or otherwise; overlapped in the final result or with mirror smooth, invisible welds uniformly 100% strong with slight or no thickness tolerance differences; comparably so in metals; all possible continuously.

It has been difficult to weld many materials together and especially so as not to show a seam or great differences in thickness tolerances. Many plastics show inadequate response to electronic welding, thermoweld only in very thin sections. In these regards the crystalline homopolymer chlorotrifluoroethylene or Kel–F is a good example. Strong molecular attractions toward greatest mass make thicknesses over about .020" nearly impossible to weld. Below about .010" thermosealability commences; due to less strong greatest mass attractions and inability to form as completely the strong, regular molecular packing normal to the melt phase in which there is more than one arrangement regularly arrayed over the whole as in a clear quartz crystal. Thicker work seals only at places of frictional plastic flow between parts to be welded together or where materials churn, which shakes up and breaks up regular packings. Fluxes which open up these surface formations, when combined, particularly, with methods of this invention, bring sealability between any thickness combinations. It must be realized that for surfaces to be permanently welded under any conditions crystals must be able to form as freely at, through or across any meeting for weld faces and the importances of this cannot be over-emphasized; otherwise, parting under rigorous heat conditions results as two levels of crystals built up with weld meeting faces the dividing line that will part.

Usual welding shows widely varying strengths; often far too much degrading, sometimes due to difficult to control heat input and pressure, or too high heat at one part to adequately weld another. Too high heat in Kel–F causes disasterous chain scission, welds parting even before use when swiftened overcrystallinity enhanced by smaller molecular weights will do the same. In acrylic too high heat results in depolymerization and vaporization. Vinyls suffer more complex, disastrous decomposition, and usually there is also oxidation from air.

Until now welds widths cannot be increased without greatly slowing the work, adding expensive and more difficult molds or dies. Material welded often thins out or holes through. Even minor film or sheet thickness variations add difficulties. In overlapped work as in electronic or hand sealing, edges are weak points requiring much added work to overcome, with the recommended practice of strapping or putting extra strips over the edges.

To overcome these difficulties and disadvantages, often eliminating them entirely, the present invention has among its objects the provision of a simple apparatus which with easy variations provides dependable, far cheaper, rapid and continuous welding of plastic film, sheet or other bodies.

It is also among the objects of the present invention to provide an apparatus and method of welding capable of forming butt or lap welds with uniform, high strength throughout, in which seams may be invisibly welded, and in which weld increases from small fractions of an inch to over one or two, and does not sacrifice speed or quality.

It is further among the objects of this invention to provide a method in which materials varying in thickness even to double or more may be readily welded. Also, where great thicknesses are not always an obstacle in bringing the mass to a correct, not seriously degrading weld or melt temperature.

It is further the object of this invention to provide a simple welding means independent of electronic or contact heat.

It is further the object of this invention to provide for easy ability to get all weld parts in similar strength and quality; to prevent thinning out, weakening or holing through. Further, that overlap work will not leave weak or loose edges which may part in wind or high stress. Further, to be able to adequately weld these edges in the one and same step after they have been even sharply beveled or rounded as desired. Also in which edges will flow and merge with parts being welded as may be important in tarpaulins or air-supported structure.

In practicing the present invention, applicant places two pieces of material with their edges together or overlapping. Aids to welding may or may not be included, which may be similar materials natural in form or treated to be adhesive promoting, or comparatively dissimilar.

Portions of material to be welded are enclosed in an airtight chamber. Chamber top and bottom consist of thin sheets of suitable material which may soften or melt but not hole through harmfully or lose air pressure and not stick to the welding unless desired. Such materials may be metals, plastics or quartz or like types; transmittive of radiation where desired.

A partial vacuum is placed in the chamber, causing the top and bottom members to press against each other, contacting weld areas with an even, fluidlike pressure. Where these outer members remain sufficiently stiffly flexible, overlapped parts and meeting areas melt and flow together as the members strive to adjust all pressures equally throughout, automatically making an effort to become parallel. High spots disappear and, under proper conditions, all overlap characteristics are lost with the weld merging into a smooth area. Thin, flexible, outer members meet over areas of parts to be welded with close, intimate contact everywhere, excluding practically all air, even with low vacuums.

There being vacuums plus comparatively all air excluded by intimate contacts, there is little or no degrading due to oxidizing. Temperatures being controllable over any widths, lengths or spots, there is little chance of overheating. Pressure being evenly applied, even over varying thicknesses with intimate contact between weld faces, loose welds due to improper contact are lost.

From outside the chamber suitable heat is provided where needed. Sometimes commonly known heat bars and elements suffice. A far more versatile and convenient form is in infra-red radiation, usually from about 7500 A. to about 6 microns in wavelength. By optical and physical means it is concentrated, absorbed, transmitted or reflected over welds as required, accurate temperature control being possible from under 200° F. to over 2000° F. Outer chambers or weld parts may be selected or made to transmit, absorb or reflect as required as may the work. For example, crystalline polyethylene absorbs shorter infra-red wave lengths until the melt is reached, at which time it then transmits and will heat no more except to any minor extent still absorbed. Outer chamber members may be Teflon on glass fabric or similarly transmittive as required material.

It should be understood that radiation transmitted is without affect, that only that absorbed is effective, therefore, the wavelengths of heat, above about 7500 A., must be absorbed to do heating; that shorter wave lengths even if absorbed do little or no heating, even under about 4000 A. when they begin to affect molecular bonds. Also, that a material such as clear acrylic may start absorbing only from about 2 microns on up, may not reach a point where previously absorbed wavelengths are transmitted and may end up depolymerizing and evaporating or degrading under the same conditions where another, such a polyethylene would heat little more after melting. Also, that the same materials may vary in transmission or absorption according to coloring or other matter that includes compoundings. In using incandescent tungsten filament heaters around about 4000°, unlike those working only in the infra-red range, wave lengths emitted may range well down into the ultra-violet and may occasionally require consideration.

By such arrangements welds are made in a few seconds in thin material, often far more quickly, comparatively, in thick; after which the vacuum is released, the containing plates separated and weld work removed. The thickness of said outer containing pieces vary and it has been found that in metals thicknesses from about .002 to .0075" is adequate; .005 to .015 usually sufficing in plastics, especially if fabric supported. In metals, most useful are those such as "Rodar" or others of extremely low coefficients of expansion. An advantage of plastics is that they may be both high temperature resistant and transmittive to the wavelengths of use and need.

The invention is more fully described in connection with the accompanying drawing constituting a part thereof and in which like reference characters indicate like parts, in which FIG. 1 is a vertical cross-sectional view of one embodiment of the invention, showing the welding of a lapped joint.

FIG. 2 is a view similar to FIG. 1 showing the position of the several elements after evacuation of the chamber and during the actual welding.

FIG. 3 is a view similar to FIG. 1 showing a modification of the invention wherein a strip of plastic material has its ends welded together to form an endless band.

FIG. 4 is a top plan view of the embodiment of FIG. 1 some parts being broken away for clearness, FIG. 5 is a fragmentary view illustrating a butt welding operation, and FIGS. 6 and 7 illustrate modified forms of the invention.

Referring to the drawing, there is provided a suitable base 1 on which a thick metal plate 2 is supported. A rectangular rubber or other elastic frame 3 rests on plate 2. Sheets 4 and 5 to be welded together are overlapped at 6 and 7. A second piece 8 of elastic material is placed on the sheets to be welded in register with frame 3. A cover plate 9 rests on frame 8, said plate being flexible.

At one point on plate 9 is a relatively thick block 10 of suitable material such as a plastic, to reinforce one portion of plate 9. Tube 11 is securely fixed in block 10 and is connected as shown by arrow 12 to a source of vacuum. A source 13 of radiant energy has a reflector 14 over the same so as to direct heat rays down over the area 6–7 to be welded. In order to increase the transmission of heat, there is usually formed on plate 9 below heat source 13 a darkened or blackened area 14'.

In the operation of the device the several parts are in position shown in FIG. 2. A moderate vacuum is applied to tube 11 and heater 13, of which there may be one on each side, is set in operation. This causes plates 2 and 9 to come in contact with each other as shown in FIG. 2. The heat penetrates through the blackened plates for absorption of radiation section 14 and on to ends 6 and 7 of plastics 4 and 5 giving melting at the weld area. A flattening of the elements which are already in intimate contact by reason of the partial vacuum and a perfect weld results without a visible seam because the applied and inherent effort of the elements is to flatten out parallel and in so doing forcing flowable plastic into both welding and smoothing or flattening out. The vacuum is cut off, plate 9 is removed and the welded article taken from the apparatus.

In FIG. 3 is shown a similar arrangement wherein a strip 15 of plastic material has its ends 16 welded together. There is provided within plate 2 a relatively thick piece of metal at the weld area. Similarly a piece of material 18 is secured inside plate 9. By reason of greater stiffness from the elements 17 and 18, the pressure exerted by plates 2 and 9 is concentrated over a relatively small width of the overlapped weld line in a uniform manner so as to more strongly press and even or flatten out the welding portions and render the seams invisible. Placed comparably to these elements 17 and 18, strips of thin copper may be used to diffuse heat (not over .010" thick) more widely over weld areas, especially if radiation is concentrated more narrowly than needed; or such strips may be used to impart special surfaces from mirror smoothness to designs in the melted or welded area by means of engraving or surface texture.

In FIG. 5 we have shown a fragmentary view of the plates in a butting relation. Plates 4' and 5' are placed together end to end within the apparatus shown in FIGS. 1–3. A space 20 is provided and the flow of material during welding will fill the gap. The operation in making a butt weld is the same as described above.

In FIG. 6, the plastic sheet 20 is formed into a band or tube and the ends 21 are overlapped. Thermostatically controlled heating element 22 in contact with heat bar 23 is flanked by asbestos blocks 24. Metal parting strip 25 is placed between heat element 22 and overlap 21. Above the band is heating element (electric) 26 attached to heat bar or block 27. Flexible plate 28 is attached to bar 27. Liquid under pressure 29 is enclosed in flexible envelope 29 which may be of metal such as copper. Metal parting strip 30 is placed beneath envelope 29.

In operation, heaters 22 and 26 and associated parts are moved into the direction of arrows 31 and 32 until they are in pressure contact with overlap 21. The heat causes softening of the plastic. Heat bar 27 may be at a temperature below the plastic melt and transfer heat thru envelope 29. Lower heat bar 22 may be at a temperature above the melting point of the plastic causing fusion and proper flow, thus completing the weld. Pressure in envelope 29 is obtained by the use of a small hydraulic pump or by other means.

Referring to FIG. 7, the system is similar to that of FIG. 6. The sheet 20' of plastic material to be welded has a metal parting strip 33 centrally thereof. Such an arrangement permits the fabrication of tubes or bands of relatively small diameter. The width of heaters 22 and 26 is less than that of envelope 29 so that it confines lower face 34 of sheet 20' and prevents flow of the material during the welding. At the same time that material which is at the overlap 21 can flow and form a smooth seam.

There are numerous advantages inherent in the present operation, among which is the simplicity of the apparatus, the effectiveness and speed with which the welding is conducted and the superior results obtained with refractory plastics. The plastic film or sheet is weldable continuously or otherwise. Weld lines become invisible with special surface texture or embossing easily duplicated, calendered rolls joined with parting lines of their patterns impossible to find; this in butt or overlap work. Or it may be the simple closing of a pinhole. By using large radiant areas over the expanse of wide film or sheet, welds may be traced in any desired pattern and they may be changed in seconds at the slightest of costs in any way of calculation. New abilities in encapsulation or packaging open up. Large panels can be joined, where needed with fluxes or fluxing materials. This is particularly valuable with both newer processing and new plastics not so easily susceptible to solvents or thermosealing. In plastics, fluxes activate weld area molecules to work more loosely with their own neighbors and admit mixing with those of work welded to. Or they may be such as FEP Teflon which will thermoseal to TFE Teflon and become intermediary to another TFE Teflon that would not weld together otherwise. Materials such as Hypalon, Neoprene and various cross-linked materials, when non-thermosealable may have a surface coating or an interpolatable heat reactivatable adhesive. Such a material is Pliobond of the Goodyear Tire and Rubber Company, which dries completely but upon heating reactivates to seal. This is only one of many such available, which happens to be not too effective on Hypolon, which is permanently welded best with different agents according to compounding. In metals, the comparable follows, as in brass type brazing alloys, silver and soft solders, except that flux or oxide removing agents are much less necessary and more care must be taken that there is no adhesion to undesired members. I have found some materials, such as very thin lead sheet, adequately weldable only by these methods.

All work may move continuously without touching bars or jaws. Material may be hanging as in drappery or in position as a lining. Across both sides of the to-be welded overlap line, plastic strip is placed, such as Aclar chlorofluorocarbon film of Allied Chemical, with edges airtight by reason of taping. A partial vacuum at one end travels negative pressure along all edges to be welded, usually assisted by aids which will travel vacuum along without its being blocked off. Intimate contact between plastic to be welded is all that is required, in pressures even in fractions of a pound in many plastics; it being probable that electric charges applied bringing surfaces to be welded intimately together will accomplish the same thing. It is rare that the welder cannot gauge the melting and fusing of the plastic, not to be able to move on or relieve heat once this is accomplished. Degrading is enormously reduced, often possible of complete elimination in the touchiest material. Cost is comparatively insignificant, speed much faster. Work of this same kind can be applied to lamination.

By the present methods, much of today's involvement, considered required to do welding, is done away with. Clamps, jaws, pressure devices and electricity elaborately managed becomes unnecessary. And this is not only in terms of film, but also in all the fabricating that is done in shops everywhere of sheet plastic or metal and so on. A radiant heat source of a proper kind and partial vacuums to practically everything requiring only a single individual.

While the invention has been described setting forth two specific embodiments thereof, the invention is not limited thereto, as many changes in the details may be made within the scope of the invention. For instance, the pressure within the chamber may be varied over a wide range. In most cases, a vacuum of six inches of mercury at the weld has been found sufficient and a vacuum of up to about twenty inches of mercury will insure the production of mirror seams. While there have been described elastic materials for frames 3 and 8, any other means suitable for holding a vacuum may be used. The shape of the apparatus may be altered to suit the character of the sheets to be welded. In some cases, the bottom plate 2 may be dispensed with as, for example, where a package is wrapped in a plastic sheet similar to band 15 and the ends of the wrapper welded together.

In the heating the radiation may be applied in ways common to light projection or optics, usually utilizing heat wave lengths. Sources may be coiled grid elements, infra-red bars or coiled elements in a quartz tube.

What is claimed is:
1. A method of welding plastic which comprises placing two pieces of a plastic material in contact, enclosing said contacting pieces in a chamber, evacuating said chamber, causing a wall of said chamber to exert pressure on said pieces, impinging radiant heat through said wall onto the area of contact and heating the same to welding temperature, and causing sufficient flow at said area to form a smooth surface.
2. A method according to claim 1 characterized in that said pieces are in overlapping contact.
3. A method according to claim 1 characterized in that said pieces are in end abutment.
4. A method according to claim 1 characterized in that said heating is on opposite sides of said pieces.
5. A method according to claim 1 characterized in that a body of relatively thick plastic is interposed between said wall and said contacting pieces.
6. A method according to claim 5 characterized in that the area of said thick plastic is greater than the area of the contact area of said pieces.
7. Apparatus for welding plastics comprising a base plate, a cover plate spaced from and substantially parallel with said base plate and defining an enclosed chamber, means for applying a vacuum on said chamber, at least one of said plates being adapted to flex under the influence of said vacuum, means for holding plastic pieces to be welded together within said chamber, a radiant heater outside of said chamber adapted to project heat rays onto said flexible plate to heat an area of said plate aligned with the area of said pieces to be welded, whereby heating of said plastic is localized.
8. An apparatus according to claim 7 characterized in that said flexible plate is blackened adjacent to said aligned area.
9. An apparatus according to claim 7 characterized in that said flexible plate is in contact with said plastic when said vacuum is applied.
10. An apparatus according to claim 7 characterized in that elastic members enclosing the area of said plastic to be welded are in contact with said plates forming a seal.
11. An apparatus according to claim 7 characterized in that elastic members enclosing the area of said plastic to be welded are in contact with said plates forming a seal, said plastic pieces being held between said elastic members.
12. An appratus according to claim 7 characterized in that said flexible plate having a thickness of about 0.01" to 0.001".
13. An apparatus according to claim 7 characterized in that said flexible plate has a thickened portion and a tube for said vacuum passes through said thickened portion.
14. An apparatus according to claim 7 characterized in that a flat member of an area greater than the area of said weld is within said chamber adjacent to said area to provide increased pressure on said area.
15. An apparatus according to claim 7 characterized in that a mold release agent is interposed between said weld area and said flexible plate.

References Cited
UNITED STATES PATENTS

| | | | |
|---|---|---|---|
| 2,731,654 | 1/1956 | Nowak | 156—285 |
| 2,978,008 | 4/1961 | Conti | 156—285 |
| 3,130,101 | 4/1964 | Gittins et al. | 156—272 |
| 3,247,041 | 4/1966 | Henderson | 156—272 |

DOUGLAS J. DRUMMOND, *Primary Examiner.*